US009646474B2

(12) United States Patent
Datta et al.

(10) Patent No.: US 9,646,474 B2
(45) Date of Patent: May 9, 2017

(54) METHOD AND ELECTRONIC DEVICE FOR GENERATING A CROWD-SOURCED ALERT

(71) Applicant: Google Technology Holdings LLC, Mountain View, CA (US)

(72) Inventors: Ruchita Datta, Bangalore (IN); Hajira Akram, Bangalore (IN)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 14/314,402

(22) Filed: Jun. 25, 2014

(65) Prior Publication Data

US 2015/0379834 A1    Dec. 31, 2015

(51) Int. Cl.

| | |
|---|---|
| *G08B 3/10* | (2006.01) |
| *G08B 15/00* | (2006.01) |
| *G08B 25/00* | (2006.01) |
| *G08B 25/01* | (2006.01) |
| *H04W 4/00* | (2009.01) |
| *H04L 1/00* | (2006.01) |

(52) U.S. Cl.
CPC ......... *G08B 15/004* (2013.01); *G08B 25/001* (2013.01); *G08B 25/009* (2013.01); *G08B 25/016* (2013.01); *H04L 1/00* (2013.01); *H04W 4/00* (2013.01)

(58) Field of Classification Search
CPC .................................. H04W 4/00; H04L 1/00
See application file for complete search history.

(56) References Cited

U.S. PATENT DOCUMENTS

| | | | |
|---|---|---|---|
| 5,917,887 A | 6/1999 | Fesler et al. | |
| 2004/0181321 A1* | 9/2004 | Fries | B61L 29/226 701/19 |
| 2005/0253711 A1* | 11/2005 | Nelson | F41H 11/136 340/552 |
| 2010/0134277 A1 | 6/2010 | Jang | |
| 2010/0211970 A1* | 8/2010 | Howarter | G08B 27/008 725/33 |
| 2010/0291894 A1* | 11/2010 | Pipes | H04W 4/02 455/404.2 |
| 2012/0064855 A1 | 3/2012 | Mendelson | |
| 2014/0214832 A1* | 7/2014 | Nandakumar | G06F 17/30861 707/737 |
| 2014/0306799 A1* | 10/2014 | Ricci | B60Q 1/00 340/5.83 |

FOREIGN PATENT DOCUMENTS

WO    2013178869 A1    12/2013

* cited by examiner

*Primary Examiner* — Shirley Lu
(74) *Attorney, Agent, or Firm* — Morris & Kamlay LLP

(57) ABSTRACT

During an emergency, a user initiates an emergency trigger, which puts an electronic device into an emergency mode. The device then emits an emergency sound wave having one or more particular characteristics. In one embodiment, the emergency sound wave is inaudible. The device may then emit an audible alert. Nearby devices that detect the emergency sound wave may then, once they validate the emergency sound wave emit their own emergency sound waves, and emit their own audible alerts. This process allows the original alert to be propagated to many devices in the vicinity creating, in effect, a mesh of alerted devices.

20 Claims, 6 Drawing Sheets

METHOD AND ELECTRONIC DEVICE FOR GENERATING A CROWD-SOURCED ALERT

TECHNICAL FIELD

The present disclosure relates generally to sound-based alerting devices and, more particularly, to a method and electronic device for generating a crowd-sourced alert.

BACKGROUND

Modern telecommunication technology has helped to address many issues relating to personal safety. Whereas in the past, a person needing immediate assistance had to shout for help, run for help, or run to the closest land-based telephone, the person can now call or text for help using a cell phone. There are still circumstances in which relying on radio-based cellular communication may be insufficient, however, such as when the person needing help is in an area where there is no cellular coverage and no public WiFi available, or the person no longer has an active cellular plan.

DRAWINGS

While the appended claims set forth the features of the present techniques with particularity, these techniques may be best understood from the following detailed description taken in conjunction with the accompanying drawings of which:

DESCRIPTION

Figure 1A:
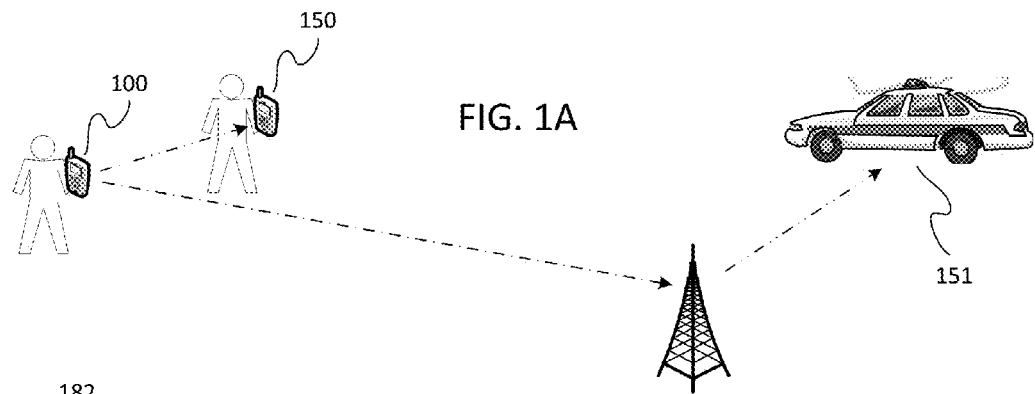
FIGS. 1A-1C is a conceptual view of a mesh of alerted electronic devices according to an embodiment.

The disclosure is generally directed to a method and an electronic device (e.g., a cell phone such as a smartphone, a tablet computer, or a wearable electronic device such as a smart watch) for generating a crowd-sourced alert. According to various embodiments, when a user of the electronic device perceives an emergency, the user initiates an emergency trigger (e.g., a physical input to the device, a voice trigger, or a gesture), which puts the device into an emergency mode. In an embodiment, the device becomes unusable once it enters the emergency mode in order to prevent it from being misused. The device then emits an emergency sound wave having one or more particular characteristics (e.g., frequency, intensity, standard deviation, and amplitude). According to an embodiment, the emergency sound wave is a pure sine wave or "true" sine wave, which may allow it to travel more effectively through obstacles (e.g., walls). As a general rule, the frequency of a sound wave is inversely proportional to the distance it is able to travel. Thus, the frequency of the emergency sound wave may be suitably altered to allow it to travel larger distances, thereby increasing its effective radius. In one embodiment, the emergency sound wave is inaudible—i.e., it has a frequency that is outside of the normal range of human hearing (typically between 20 and 20,000 Hertz). The device may also emit an audible alert (e.g., a siren). Nearby devices that detect the emergency sound wave may then, once they validate the emergency sound wave (i.e., identify it as being an emergency sound wave) emit their own emergency sound waves (e.g., duplicates of the original emergency sound wave), and emit their own audible alerts. This process allows the original alert to be propagated to many devices in the vicinity creating, in effect, a mesh of alerted devices. Even if the originating device leaves the mesh (e.g., is powered down or compromised), the mesh can remain active.

Because the alert is sound based, the electronic device may carry out the method described herein without cellular connectivity, Bluetooth® connectivity, WiFi connectivity, or even a subscriber identity module ("SIM"). When the device is in emergency mode and cellular connectivity is available, the device may enter a "beacon mode" in which it periodically (e.g., every three seconds) transmits a short message service ("SMS") emergency message to pre-defined contacts. The device may also send an SMS with information regarding its location and its international mobile station equipment identity ("IMEI") to local police stations.

In an embodiment, the electronic device can also cancel the emergency alert by emitting an all-clear sound wave. Like the emergency sound wave, the all-clear sound wave may be a pure sine wave, and may be inaudible. Other devices that receive and authenticate the all-clear sound wave will cease emitting their audible alerts. The other devices may propagate the all-clear sound wave in the same manner that they propagated the emergency sound wave.

Figure 1B:
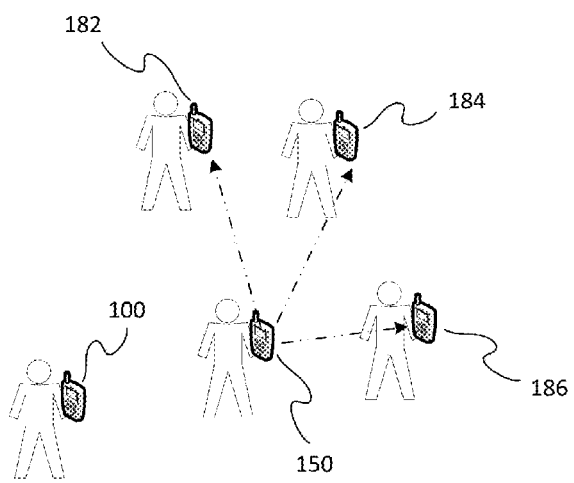
Figure 1C:
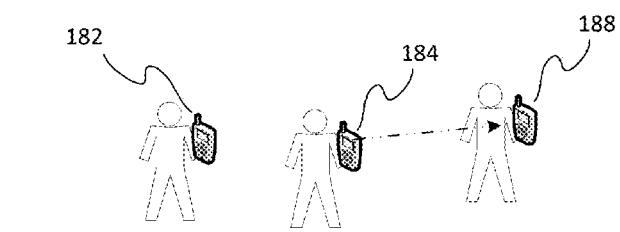
Figure 1C:
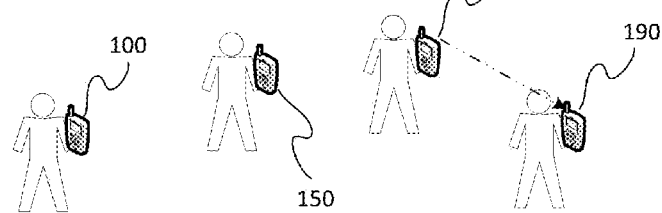

Turning to FIGS. 1A-1C, an example of how a mesh of alerted devices is created in an embodiment is as follows. Each of the electronic devices depicted in FIGS. 1A-1C is a portable electronic device. A user places a first electronic device 100 in an emergency mode. The first electronic device 100 emits a first emergency sound wave, which a second electronic device 150 detects (FIG. 1A). If cellular connectivity is available, the first electronic device 100 may also transmit an emergency SMS to a public safety authority 151 (e.g., a nearby police station or fire station) containing the IMEI of the first electronic device 100 in order to discourage misuse of the alert functionality. The second electronic device 150 validates the emergency sound wave, and then emits a second emergency sound wave (FIG. 1B). A third electronic device 182, a fourth electronic device 184, and a fifth electronic device 186 each detect the second emergency sound wave. In this example, the user of the third electronic device 182 opts not to pass on the emergency alert, but the fourth electronic device 184 and the fifth electronic device 186 each generate their own emergency sound waves (FIG. 1C), which are detected by sixth and seventh electronic devices 188 and 190, respectively. The originating device (the first electronic device 100) and any of the subsequently-alerted devices may also emit audible alerts. In an embodiment, each device's audible alert is distinct from that of the originating device. As a result of this process, a mesh of alerted devices is formed, which includes the second electronic device 150, the fourth electronic device 184, the fifth electronic device 186, the sixth electronic device 188, and the seventh electronic device 190. Obviously, the mesh may include any number of electronic devices.

To stop the alert according to an embodiment, the person who initiated the alert may cancel it on the first electronic device 100 (e.g., by entering a personal identification number ("PIN") via a user interface ("UI")). The first electronic device 100 then emits an all-clear sound wave, which may also be inaudible, and which has different characteristics than the emergency sound wave. Those devices detecting the all-clear sound wave can pass on the all-clear message to the remaining devices in the same manner that they passed on the emergency alert (as described in conjunction with FIGS. 1A-1C). Each device receiving (and validating) the all-clear sound wave can then stop emitting its audible alerts.

According to an embodiment, the first emergency sound wave includes a code, which is also incorporated into the emergency sound waves emitted by the fourth electronic device 184 and the fifth electronic device 186. The devices in the mesh of alerted devices may use this code to authenticate any subsequent all-clear sound wave.

The term "electronic device" as using herein may refer to a variety of different types of devices, including cell phones (e.g., smartphones), tablet computers, and various types of wearable devices (e.g., smart watches).

Figure 2:
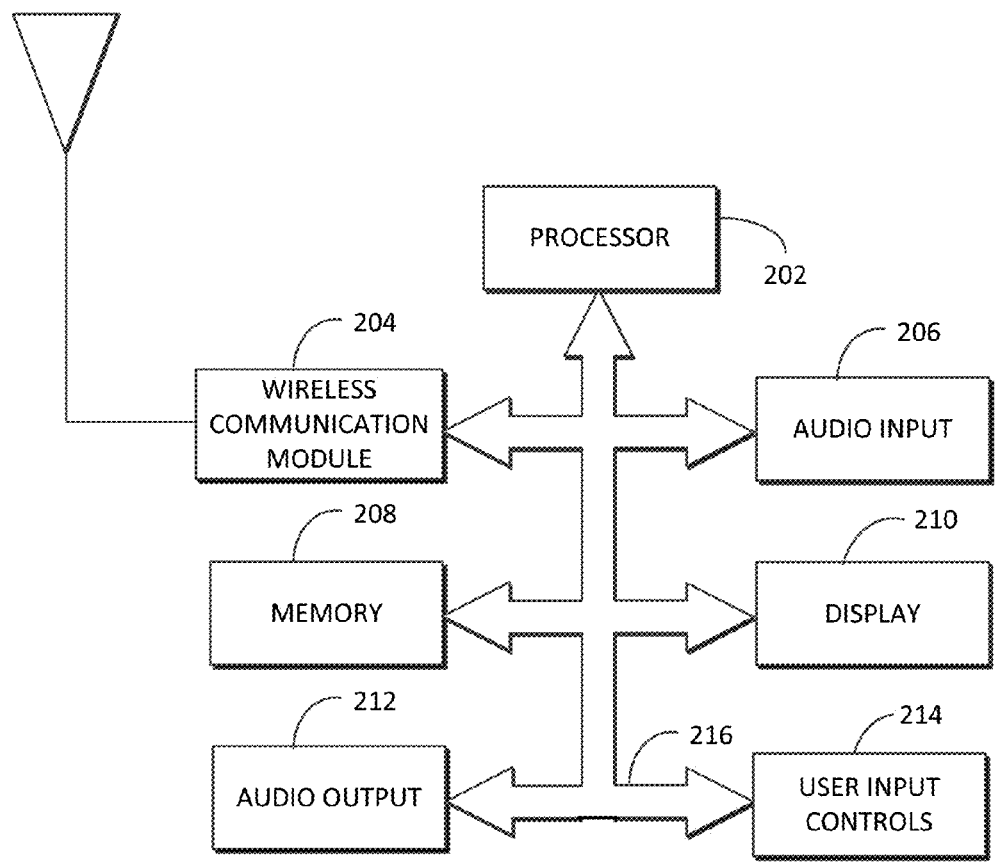
FIG. 2 is a block diagram of an electronic device according to an embodiment.

Turning to FIG. 2, one embodiment of an electronic device that may be used in various embodiments includes a processor 202 (e.g., an applications processor, a controller, or a signal processor), a wireless communication module 204 (e.g., a communication chip such as a WiFi chip, or a communication chipset, such as baseband chipset or Bluetooth® chipset), an audio input 206 (e.g., a microphone), a memory 208 (which can be implemented as volatile memory or non-volatile memory), a display 210 (e.g. an organic light-emitting diode display), an audio output 212 (e.g., a speaker and a pure sine wave inverter), and user input controls 214 (e.g., touch sensor controls on the display 210, user interface on the display 210, and physical buttons on the electronic device, such as a power button).

The processor 202 retrieves instructions and data from the memory 208 and, using the instructions and data, carries out the methods described herein. The processor 202 provides outgoing data to, or receives incoming data from the wireless communication module 204. Each of the elements of FIG. 2 is communicatively linked to one or more other elements via one or more data pathways 216. Possible implementations of the data pathways 216 include wires and conductive pathways on a microchip.

Figure 3:
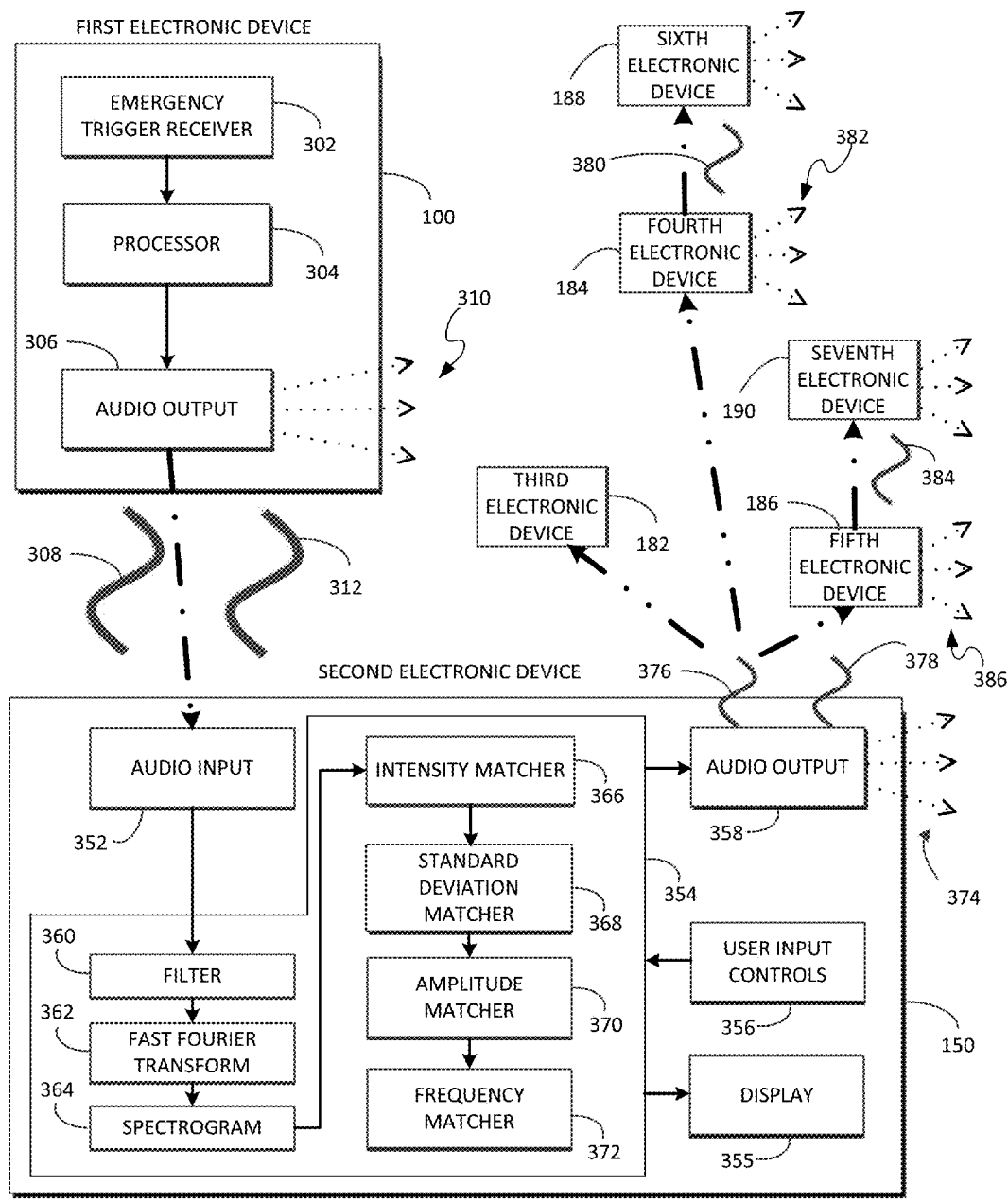
FIG. 3 is a block diagram of a mesh of alerted electronic devices according to an embodiment.

Turning to FIG. 3, the manner in which the electronic devices of FIGS. 1A-1C are configured and the ways in which they interact in an embodiment will now be described. The first electronic device 100 includes a trigger receiver 302, a processor 304, and an audio output 306. The processor 304 and the audio output 306 may have the same configuration and functionality as the processor 202 and audio output 212 of FIG. 2.

To set up the first electronic device 100 in an embodiment, the user sets up a recovery PIN, selects one or more contacts (e.g., from the address book of the first electronic device 100) to be alerted when the first electronic device 100 is in emergency mode, and sets up a message that is to be sent (e.g., via SMS), such as "Help me!" The crowd-sourced alert functionality may be a feature that is pre-installed on the first electronic device 100, or may be part of a crowd-sourced alert app that the user downloads and installs (e.g., from Google Play®, iTunes®, etc.)

During operation of the first electronic device 100, the trigger receiver 302 receives an emergency trigger initiated by a user of the first electronic device 100 and provides a signal to the processor 304 in response to receiving the trigger. An "emergency trigger" is an action carried out by the user to indicate an emergency situation. There are many possible types of emergency triggers that may be used. In one embodiment, the trigger receiver 302 includes a power button and a power controller of the first electronic device 100, and the emergency trigger is successive presses on the power button. In another embodiment, the trigger receiver 302 is a microphone of the first electronic device 100, and the emergency trigger is a panic word spoken by the user, such as "Help!" In still other embodiments, the trigger receiver 302 is the touch-screen user interface of the first electronic device 100. The processor 304 reacts to the signal from trigger receiver 302 by controlling the audio output 306 to emit a first emergency sound wave 308 and an audible alert 310. As will be explained in further detail below, the first emergency sound wave 308 has one or more characteristics that allow other devices to identify it as an emergency sound wave. The first emergency sound wave 308 may also include a code that the other electronic devices use to authenticate any subsequent all-clear signal. As previously noted, the first emergency sound wave 308 may be a pure sine wave.

The second electronic device 150 includes an audio input 352, a processor 354, a display 355, user input controls 356, and an audio output 358. These components may have the same configuration and functionality as the audio input 206, processor 202, display 210, user input controls 214, and audio output 212 of FIG. 2.

Figure 4:
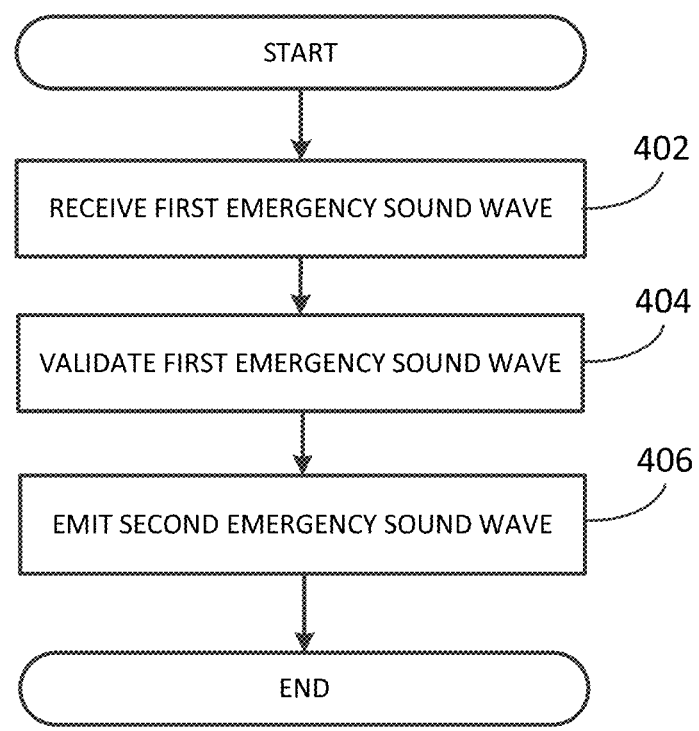
FIGS. 4-6 are flowcharts depicting methods carried out according to various embodiments.

Turning to FIG. 4, with continued reference back to FIG. 3, the audio input 352 receives the first emergency sound wave 308 (block 402) and provides audio signals representing the emergency sound wave 308 to the processor 354. The processor 354 then validates the first emergency sound wave 308 (block 404) based on one or more characteristics of the emergency sound wave 308. Possible characteristics include the intensity, standard deviation, amplitude, and frequency of the emergency sound wave 308. An example of how this validation is carried out will be described below in further detail in conjunction with FIG. 6. In one embodiment, the processor 354 executes instructions of a series of functional blocks. These blocks include a filter 360, a fast-Fourier transform ("FFT") 362, a spectrogram 364, an intensity matcher 366, a standard deviation matcher 368, an amplitude matcher 370, and a frequency matcher 372.

If the processor 354 successfully validates the emergency sound wave 308, the processor 354 may then show an alert on the display 355, such as "EMERGENCY ALERT!!!! Someone nearby is in danger, please help!!!" and give the user the option, via the user input controls 356, to ignore the alert or to alert others. The processor 354 may also control the audio output 358 to emit a second audible alert 374, which will be distinct from the first audible alert 310 emitted by the first electronic device 100. For example, the processor 354 may display the on-screen buttons "Alert Others" and "Cancel" on the display 355. If the user chooses (via the user input controls 356) to ignore the alert, then processor 354 controls the audio output 358 to cease emitting the second audible alert 374 and then takes no further action. If the user chooses (via the user input controls 356) to alert others, then the processor 354 controls the audio output 358 to emit a second emergency sound wave 376 (block 406), which has the same characteristic or characteristics by which the processor 354 validated the first emergency sound wave 308, and which may be inaudible and be a pure sine wave.

As discussed in conjunction with FIGS. 1A-1C, other electronic devices (which may have configurations similar to that of the second electronic device 150) may detect the first emergency sound wave 308 or the second emergency sound wave 376, give the user the same options, and react in the same manner as the second electronic device 150. For example, the third electronic device 182 could detect the second emergency sound wave 376, validate the second emergency sound wave 376, and ignore the alert based on user input. The fourth electronic device 184 could detect the second emergency sound wave 376, validate the second emergency sound wave 376, emit a third emergency sound wave 380, and emit a third audible alert 382. The fifth electronic device 184 could detect the second emergency sound wave 376, validate the second emergency sound wave 376, emit a fourth emergency sound wave 384, and emit a fourth audible alert 386. This process could continue with the sixth electronic device 188 and the seventh electronic device 190. As with the second emergency sound wave 376, the subsequent emergency sound waves have the characteristic or characteristics by which the processor 354 validated the first emergency sound wave 308, may be inaudible, and may be a pure sine waves.

Figure 5:
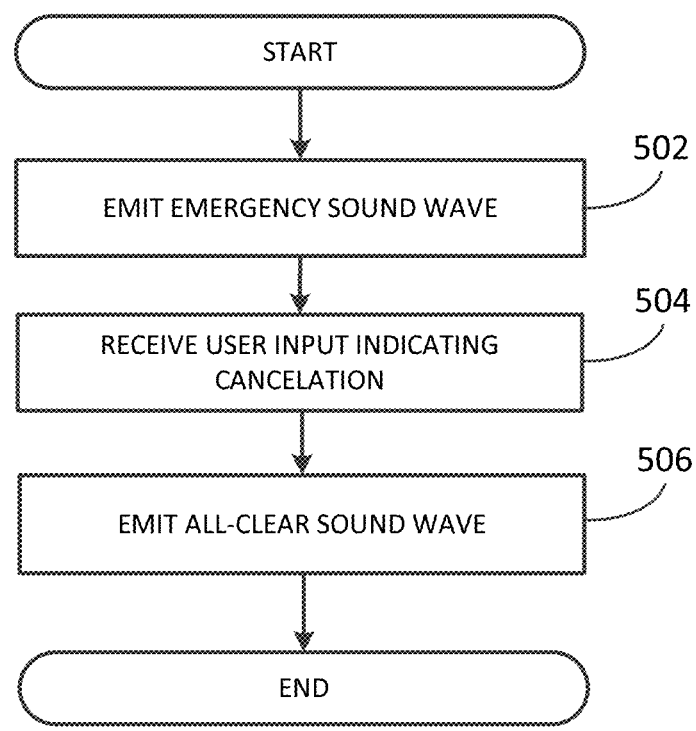

Turning to FIG. 5, with appropriate reference back to FIG. 3, an embodiment of the first electronic device 100 can both initiate an emergency alert to create a mesh of alerted devices and cancel the emergency alert to close the mesh of alerted devices. For example, assume that the electronic device 100 has initiated an emergency alert by emitting an emergency sound wave (block 502), and has done so as described above. As a result, a mesh of alerted devices, including the second electronic device 150, the fourth electronic device 184, the fifth electronic device 186, the sixth electronic device 188, and the seventh electronic device 190 is created. To cancel the emergency, the user of the first electronic device 100 initiates an all-clear trigger. An "all-clear trigger" is a user input indicating that the emergency no longer exists. The trigger receiver 302 receives the user input indicating the cancellation (block 504). In one embodiment, the all-clear trigger is successive presses on the power button plus the entry of the user's recovery PIN into the electronic device 100. In response to receiving the all-clear trigger, the trigger receiver provides a signal to the processor 304. The processor 304 reacts to the signal by controlling the audio output 306 to emit an all-clear sound wave 312 (block 506) and to cease emitting the audible alert 310. As with the emergency sound wave 308, the all-clear sound wave 312 has one or more characteristics that allow other devices to identify it as an all-clear sound wave. In an embodiment, the all-clear sound wave includes a code (which was also in the first emergency sound wave 308). The user's recovery PIN may be used as the code.

The audio input 352 of the second electronic device 150 detects the all-clear sound wave 312 and provides audio signals representing the all-clear sound wave 312 to the processor 354. When the processor 354 receives the audio signals of the all-clear sound wave 312, the processor 354 validates the all-clear sound wave 312 based on one or more characteristics of the all-clear sound wave 312. Possible characteristics include the intensity, standard deviation, amplitude, and frequency of the all-clear sound wave 312. Additionally, the processor 354 may attempt to authenticate the all-clear sound wave by checking to see if it includes the code that accompanied the original emergency sound wave 308. If the processor 354 successfully validates the all-clear sound wave 312 and verifies that the all-clear sound wave includes the proper code, the processor 354 may then show a message on the display 355 indicating that the emergency is over. The processor 354 then controls the audio output 358 to emit a second all-clear sound wave 378, which has the same characteristic or characteristics by which the processor 354 validated the first all-clear sound wave 376 and includes the same code. The processor 354 also controls the audio output 358 to cease emitting the second audible alert 374. The fourth electronic device 184, fifth electronic device 186, sixth electronic device 188, and seventh electronic device 190 may each receive the all-clear message in the same manner as the second electronic device 150, and may each react in the same manner. As with the second all-clear sound wave 378, the subsequent all-clear sound waves have the characteristic or characteristics by which the processor 354 validated the first all-clear sound wave 308, may be inaudible, and may be a pure sine waves. The alerted electronic devices of the mesh propagate the all-clear signal throughout the mesh, thereby shutting it down.

Figure 6:
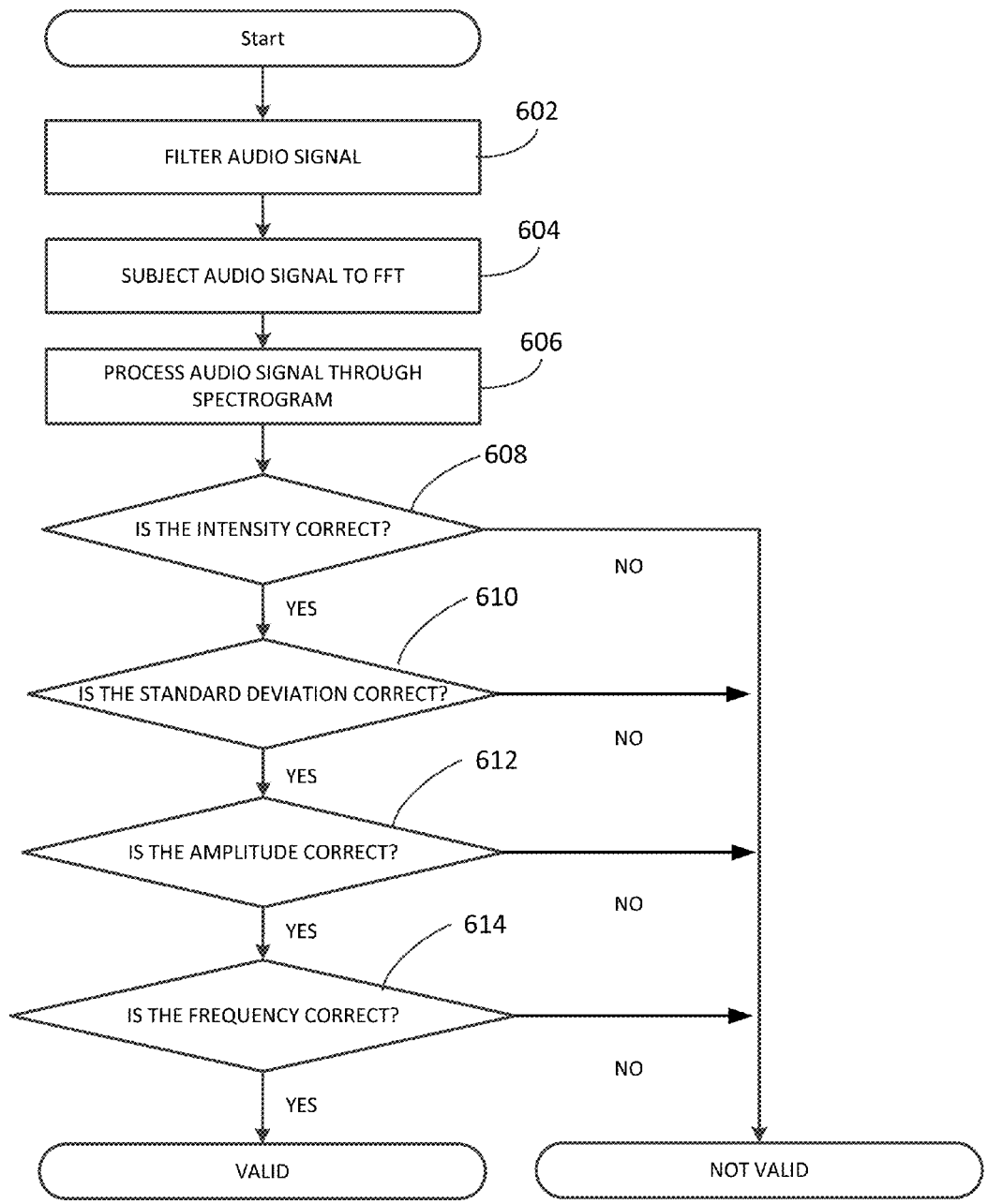

Turning to FIG. 6, to validate an emergency sound wave or an all-clear sound wave in an embodiment, the second electronic device 150 (or other electronic device of FIG. 3) carries out the following procedure. At block 602, the processor 354 filters the audio signal received from the audio input 352. At block 604, the processor 354 subjects the audio signal to an FFT. At block 606, the processor 354 processes the audio signal through a spectrogram. At block 608, the processor 354 tests the intensity of the sound wave (i.e., the first emergency sound wave 308 or the first all-clear sound wave 312) against a predetermined criterion (e.g., compares it with a predetermined intensity level). If the intensity does not meet the predetermined criterion, then the validation process fails. If the intensity does meet the predetermined criterion, then the process moves to block 610. At block 610, the processor 354 tests the standard deviation of the sound wave against a predetermined criterion (e.g., compares it with a predetermined standard deviation). If the standard deviation does not meet the predetermined criterion, then the validation process fails. If the standard does meet the predetermined criterion, then the process moves to block 612.

At block 612, the processor 354 tests the amplitude of the sound wave against a predetermined criterion (e.g., compares it with a predetermined amplitude). If the amplitude does not meet the predetermined criterion, then the validation process fails. If the amplitude does meet the predetermined criterion, then the process moves to block 614. At block 614, the processor 354 tests the frequency of the sound wave against a predetermined criterion (e.g., compares it with a predetermined frequency, such as 100 Hertz). If the frequency does not meet the predetermined criterion, then the validation process fails. If the frequency does meet the predetermined criterion, then the validation succeeds—i.e., the sound wave is validated. As previously discussed, an emergency sound wave and an all-clear sound wave have different sound characteristics. Additionally, there may be multiple types of emergency sound waves. For example, one type of emergency sound wave having a first set of characteristics may be directed to nearby electronic devices while another type of emergency sound wave having a second set of characteristics may be directed to police or medical personnel in the area.

According to some embodiments, the sound waves emitted by the electronic devices of FIG. 3 include encoded data. For example, the first emergency sound wave 308 may contain information regarding the first electronic device 100, such as the device's IMEI and location. In relaying the emergency alert, the other electronic devices may also include this information in their respective emergency sound waves. Having this information may assist helpful passers-by and public safety officials in their efforts to help the user experiencing the emergency.

In an embodiment, one or more of the devices of the alerted mesh of FIGS. 1A-1C and 3 may function as a master in the mesh along with the originating device. A master could be an electronic device of a pre-configured contact or of a public safety authority. A master could also be server controlled if there is data connection. In this way, if the originating device is compromised, the alternative master could control the mesh.

According to another embodiment, the first electronic device 100 may have both an emergency mode (described above) and an abduction mode indicating that the user is being abducted. In the regular emergency mode, the processor 354 controls the audio output 358 to emit the first emergency sound wave 308 in a single burst. In the abduction mode, the processor 354 controls the audio output 358 to emit the first emergency sound wave 308 continuously. Each mode could be triggered by a different user input. For example, the emergency mode could be triggered by the user pressing the power button of the device four times in succession and the abduction mode being triggered by the user pressing the power button six times in succession. The trigger receiver 302 would provide a signal to the processor 354 reflecting the mode according to the user input. The processor would react according to the indicated mode.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method, on a second electronic device, the method comprising:
   receiving a first emergency sound wave emitted from a speaker of a first electronic device at a microphone of the second electronic device;
   validating the first emergency sound wave received at the microphone of the second electronic device based on a characteristic of the first emergency sound wave with a processor of the second electronic device; and
   emitting a second emergency sound wave from a speaker of the second electronic device in response to the validating of the first emergency sound wave, wherein the second emergency sound wave has the characteristic upon which the first emergency sound wave was validated.

2. The method of claim 1, wherein emitting a second emergency sound wave comprises propagating the second emergency sound wave to one or more other electronic devices in order to create a mesh of alerted electronic devices.

3. The method of claim 1, wherein the characteristic is the frequency, amplitude, intensity, or standard deviation of the first emergency sound wave.

4. The method of claim 1, wherein validating the first emergency sound wave comprises testing the frequency, amplitude, intensity, and standard deviation of the first emergency sound wave against predetermined criteria.

5. The method of claim 1, further comprising emitting an audible alert.

6. The method of claim 5, wherein the first emergency sound wave includes a code, the method further comprising
   receiving an all-clear sound wave from the first electronic device;
   verifying that the all-clear sound wave includes the code; and
   ceasing to emit the audible alert.

7. The method of claim 1, wherein the first emergency sound wave includes the location of the first electronic device.

8. The method of claim 1, wherein the first emergency sound wave includes the International Mobile Station Equipment Identity number of the first electronic device.

9. The method of claim 1, wherein the first emergency sound wave is a pure sine wave.

10. A method, on a portable electronic device, the method comprising:
    emitting a first emergency sound wave from a speaker of the portable electronic device to a plurality of other portable electronic devices to create a mesh of alerted devices;
    receiving a user input indicating a cancelation of the emergency associated with the emergency sound wave;
    in response to receiving the user input, emitting an all-clear sound wave from the speaker of the portable electronic device to close the mesh by causing the plurality of other portable electronic devices in the mesh of alerted devices to cease emitting a second emergency sound wave.

11. The method of claim 10, further comprising transmitting a radio-frequency emergency message that includes the International Mobile Station Equipment Identity number of the portable electronic device.

12. The method of claim 11, further comprising transmitting the radio-frequency emergency message to a public safety entity.

13. The method of claim 10, further comprising:
    receiving an input from a user interface of the portable electronic device;
    if the input indicates an emergency mode, emit an inaudible sound wave that includes an emergency indicator in a burst from the audio output; and
    if the input indicates an abduction mode, emit the inaudible sound wave continuously from the audio output.

14. A second electronic device comprising:
    an audio input configured to detect a first emergency sound wave from a first electronic device, the audio input comprising a microphone;
    an audio output comprising a speaker; and
    a processor configured to
        validate the first emergency sound wave based on a characteristic of the first emergency sound wave detected by the microphone of the audio input, and
        control the audio output to emit from the speaker a second emergency sound wave having the characteristic upon which the first emergency sound wave was validated in response to validation of the first emergency sound wave.

15. The electronic device of claim 14, wherein processor controls the audio output to emit the second emergency sound wave to one or more other electronic devices in order to create a mesh of alerted electronic devices.

16. The electronic device of claim 14, wherein the characteristic is the frequency, amplitude, intensity, or standard deviation of the first emergency sound wave.

17. The electronic device of claim 14, wherein validating the first emergency sound wave comprises testing the frequency, amplitude, intensity, and standard deviation of the first emergency sound wave against predetermined criteria.

18. The electronic device of claim 14, wherein the processor is further configured to, upon validating the first emergency sound wave, control the audio output to emit an audible alert.

19. The electronic device of claim 18,
    wherein the first emergency sound wave includes a code,
    wherein the audio input is further configured to receive an all-clear sound wave from the first electronic device, and
    wherein the processor is further configured to verify that the all-clear sound wave includes the code, and control the audio output to cease emitting the audible alert.

20. The electronic device of claim 14, wherein the first emergency sound wave includes the location of the first electronic device.

\* \* \* \* \*